(12) United States Patent
Dhanekula et al.

(10) Patent No.: US 8,135,654 B2
(45) Date of Patent: Mar. 13, 2012

(54) GENERATING EXTENDED DATA FROM A PATTERN-RECOGNITION MODEL FOR A COMPUTER SYSTEM

(75) Inventors: Ramakrishna C. Dhanekula, San Diego, CA (US); Kenny C. Gross, San Diego, CA (US)

(73) Assignee: Oracle America, Inc., Redwood Shores, CA (US)

(*) Notice: Subject to any disclaimer, the term of this patent is extended or adjusted under 35 U.S.C. 154(b) by 732 days.

(21) Appl. No.: 12/331,173

(22) Filed: Dec. 9, 2008

(65) Prior Publication Data

US 2010/0145891 A1 Jun. 10, 2010

(51) Int. Cl.
*G06F 15/18* (2006.01)
(52) U.S. Cl. ......................................... 706/12
(58) Field of Classification Search .................. None
See application file for complete search history.

(56) References Cited

U.S. PATENT DOCUMENTS

| 7,181,651 | B2* | 2/2007 | Gross et al. | 714/37 |
| 2005/0188263 | A1* | 8/2005 | Gross et al. | 714/25 |
| 2007/0220340 | A1* | 9/2007 | Whisnant et al. | 714/33 |

OTHER PUBLICATIONS

Guestrin et al., "Distributed Regression: An Efficient Framework for Modeling Sensor Network Data", Apr. 2004, Information Processing in Sensor Networks, pp. 1-10.*
Oracle, "Regression", http://web.archive.org/web/20081203083737/http://download.oracle.com/docs/cd/B28359_01/datamine.111/b28129/regress.htm , Dec. 3, 2008.*
Banerjee et al, "Distributed Data Aggregation in Sensor Networks by Regression Based Compression", Nov. 2005, Conference on Mobile Adhoc and Sensor Systems Conference, pp. 1-8.*

* cited by examiner

*Primary Examiner* — Jeffrey A Gaffin
*Assistant Examiner* — Paulinho E Smith
(74) *Attorney, Agent, or Firm* — Park, Vaughan, Fleming & Dowler LLP

(57) ABSTRACT

Some embodiments of the present invention provide a system that generates extended data for a pattern-recognition model used in electronic prognostication for a computer system. During operation the system determines, for each sensor in a set of sensors, a regression coefficient between training data from the sensor and training data from each of the other sensors in the set of sensors. Next, for each sensor in the set of sensors, the system stretches the training data from each of the other sensors by a predetermined amount, and generates extended data for the sensor based on the stretched training data for each of the other sensors and the regression coefficients between training data from the sensor and training data from each of the other sensors.

20 Claims, 4 Drawing Sheets

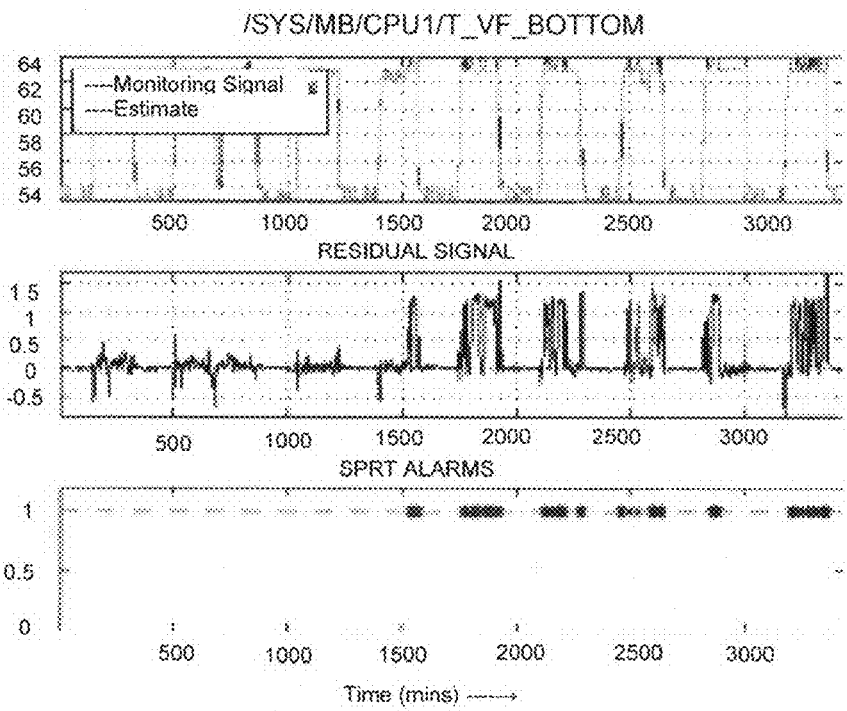
FIG. 3A
FIG. 3B
FIG. 3C
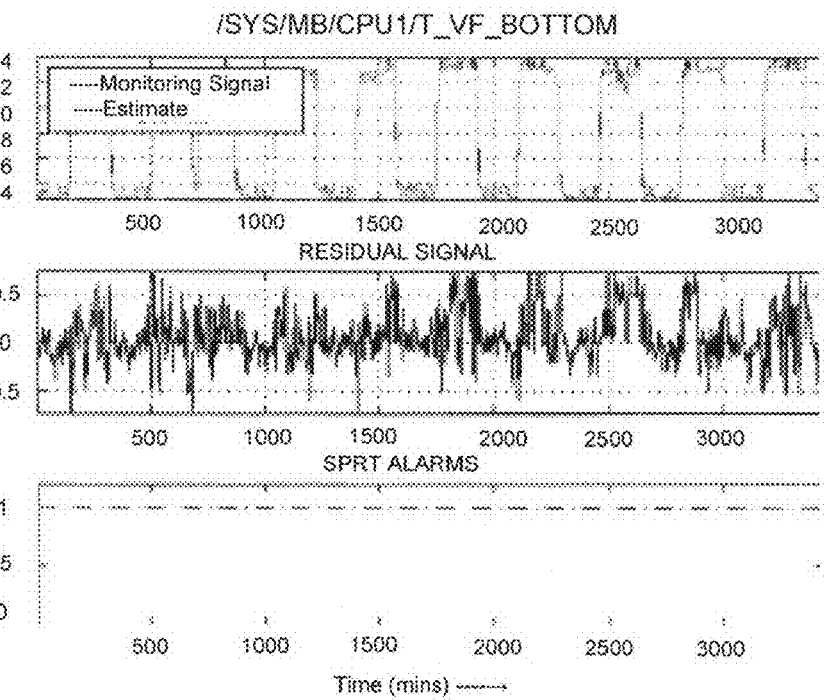
FIG. 4A
FIG. 4B
FIG. 4C

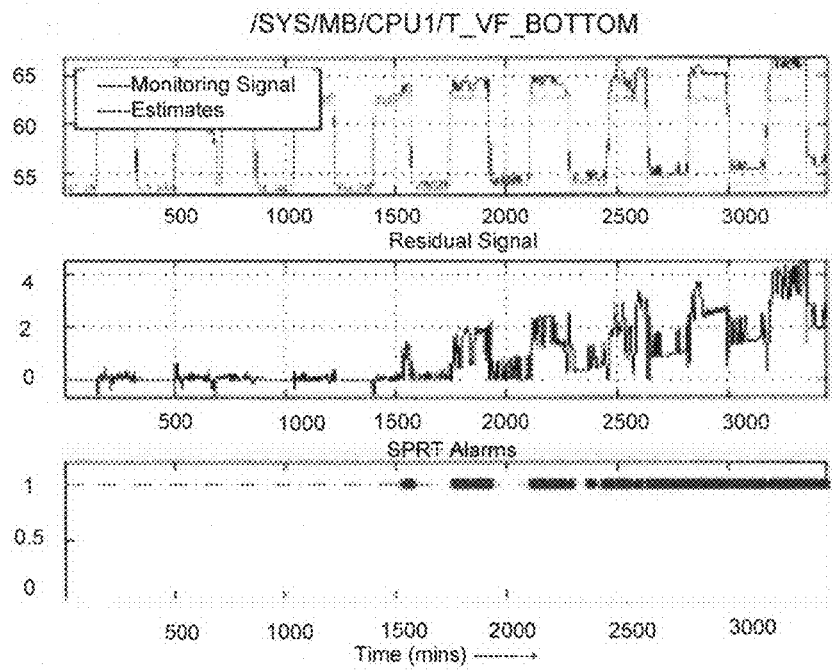
FIG. 5A
FIG. 5B
FIG. 5C
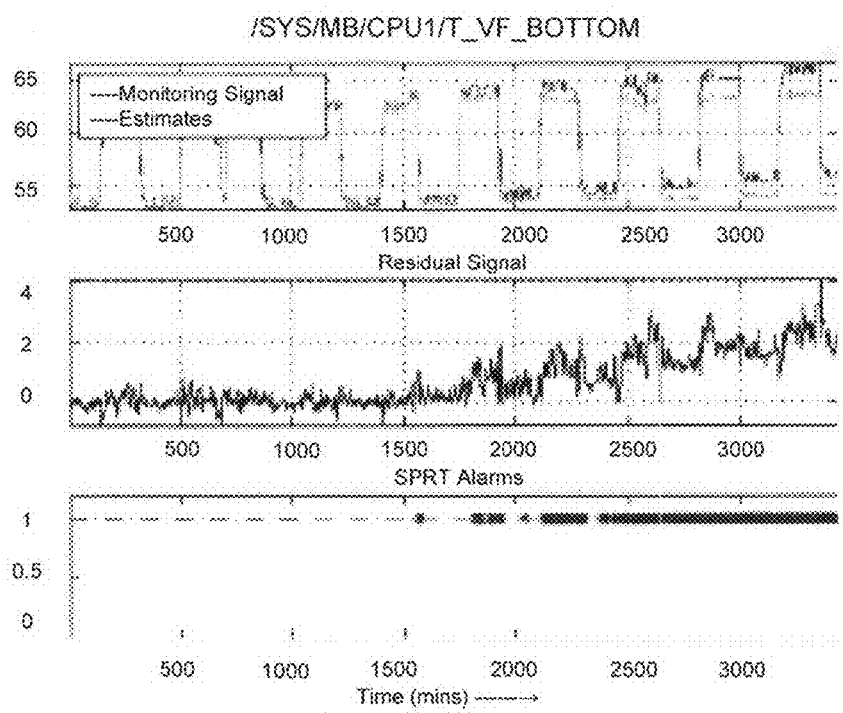
FIG. 6A
FIG. 6B
FIG. 6C

GENERATING EXTENDED DATA FROM A PATTERN-RECOGNITION MODEL FOR A COMPUTER SYSTEM

BACKGROUND

1. Field

The present invention generally relates to techniques for electronic prognostication for computer systems. More specifically, the present invention relates to a method and an apparatus that generates extended data for a pattern-recognition model used in electronic prognostication for a computer system.

2. Related Art

Many computer systems are equipped with a significant number of hardware and software sensors which can be use to monitor performance parameters of the computer system. One use for the monitored performance parameters is electronic prognostication for the computer system using a pattern-recognition model based on nonlinear, nonparametric (NLNP) regression. Typically, the pattern-recognition model is constructed during a training phase in which the correlations among the performance parameters are learned by the model. Then, during operation of the computer system, the pattern-recognition model is used to estimate the value of each performance parameter in the model as a function of the other performance parameters. Significant deviations between the estimates from the model and the monitored performance parameters may indicate a potential incipient degradation mode in the computer system.

One issue that may be encountered when using an NLNP regression pattern-recognition model is that after the training data set is generated during the training phase and used to train the model, there may be configuration changes to the computer system that cause the performance or operational regime of the computer system to shift into a regime outside of that observed during the training phase. However, an NLNP regression pattern-recognition model may not function correctly when operating on input data that falls outside of the training data set.

For example, suppose an NLNP regression pattern-recognition model is trained using a training data set generated from a computer system operating using 2 gigabyte (GB) dual in-line memory modules (DIMMs). If a customer upgrades the computer system by replacing the 2 GB DIMMs with 4 GB DIMMs that draw more power and run hotter, the operating regime of the upgraded computer may cause one or more of the monitored performance parameters, such as temperature, current, or voltage, to go outside the operational regime used during the training phase. This can result in false alarms being generated based on output from the NLNP regression pattern-recognition model, even if the computer system is functioning correctly. Typically, the model would have to be re-trained based on the new configuration. However, the training period can often be as long as 10-14 days for a computer system in the field. Additionally, training may be required each time a customer reconfigures the computer system, extending the length of time the computer system is in a training phase and potentially reducing the amount of time the model can perform electronic prognostication for the computer system.

Hence, what is needed is a method and system that generates extended data for a pattern-recognition model used in electronic prognostication for a computer system without the above-described problems.

SUMMARY

Some embodiments of the present invention provide a system that generates extended data for a pattern-recognition model used in electronic prognostication for a computer system. During operation, the system determines, for each sensor in a set of sensors, a regression coefficient between training data from the sensor and training data from each of the other sensors in the set of sensors. Next, for each sensor in the set of sensors, the system stretches the training data from each of the other sensors by a predetermined amount, and generates extended data for the sensor based on the stretched training data for each of the other sensors and the regression coefficients between training data from the sensor and training data from each of the other sensors.

In some embodiments, the pattern-recognition model uses a nonlinear, nonparametric regression technique.

In some embodiments, the pattern-recognition model uses a multivariate state estimation technique (MSET).

In some embodiments, the predetermined amount that the training data is stretched is determined based on a difference between: stretched data alarms generated by a statistical hypothesis test of residuals using a test data set for the pattern-recognition model trained with both the training data set and the extended data, and training data alarms generated by the statistical hypothesis test of residuals using the test data set for the pattern-recognition model trained with the training data set and excluding the extended data.

In some embodiments, the test data set includes test data collected during degradation of the computer system, and the number of training data alarms is equal to the number of stretched data alarms.

In some embodiments, the test data set includes test data collected during periods where there is no degradation of the computer system and there are no false stretched data alarms.

In some embodiments, for each sensor in the set of sensors, the system additionally stretches the training data from each of the other sensors by a second predetermined amount, and generates extended data for the sensor based on the training data stretched by the second predetermined amount, for each of the other sensors and the regression coefficients between training data from the sensor and training data from each of the other sensors.

In some embodiments, the set of sensors includes only a predetermined number of the sensors in the computer system with the highest correlations.

In some embodiments, the system monitors the training data from the sensors in the computer system during a training period, wherein monitoring the training data includes systematically monitoring and recording the set of training data of the computer system, and the recording process keeps track of the temporal relationships between events from different sensors.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIGS. 3A, 3B, and 3C present, respectively, monitored and estimated signals, residuals, and sequential probability ratio test (SPRT) alarms from a computer system (with no real degradation) operating outside of the training regime in which the pattern-recognition model was trained using a training data set and without extended data.

FIGS. 4A, 4B, and 4C present, respectively, monitored and estimated signals, residuals, and SPRT alarms from a computer system (with no real degradation) operating outside of the training regime in which the pattern-recognition model was trained using a training data set along with extended data.

FIGS. 5A, 5B, and 5C present, respectively, monitored and estimated signals, residuals, and SPRT alarms from a computer system (with real degradation of a sensor) in which the pattern-recognition model was trained using a training data set and without extended data.

FIGS. 6A, 6B, and 6C present, respectively, monitored and estimated signals, residuals, and SPRT alarms from a computer system (with real degradation of a sensor) in which the pattern-recognition model was trained using a training data set along with extended data.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
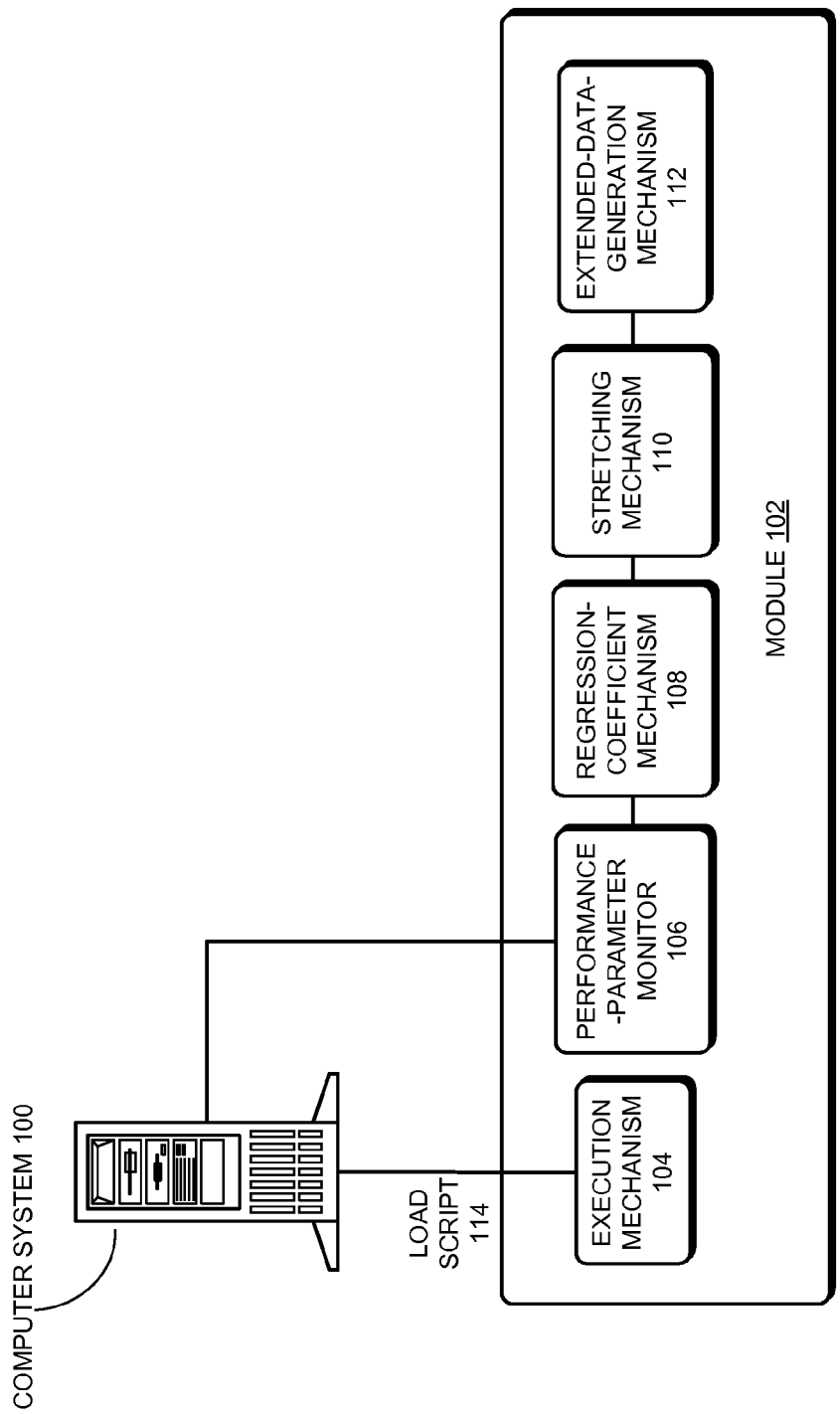
FIG. 1 represents a system that generates extended data for a pattern-recognition model used in electronic prognostication for a computer system in accordance with some embodiments of the present invention.

FIG. 1 represents a system that generates extended data for a pattern-recognition model used in electronic prognostication for a computer system in accordance with some embodiments. Computer system 100 is coupled to module 102. Furthermore, module 102 includes execution mechanism 104, performance-parameter monitor 106, regression-coefficient mechanism 108, stretching mechanism 110 and extended-data-generation mechanism 112.

Computer system 100 can include but is not limited to a server, a server blade, a datacenter server, a field-replaceable unit, an enterprise computer, or any other computation system that includes one or more processors and one or more cores in each processor.

Execution mechanism 104 can be any device that can execute load script 114 on computer system 100. Execution mechanism 104 can be implemented in any combination of hardware and software. In some embodiments, execution mechanism 104 operates on computer system 100. In other embodiments, execution mechanism 104 operates on one or more service processors. In still other embodiments, execution mechanism 104 is located inside of computer system 100. In yet other embodiments, execution mechanism 104 operates on a separate computer system.

Performance-parameter monitor 106 can be any device that can monitor performance parameters from sensors of computer system 100. Performance parameter can include but is not limited to one or more of: temperatures, currents, and/or voltages of computer system 100 or any chip (including a processor) in computer system 100; fan speeds; performance metrics, loads (including current loads), moving history window of load, throughput variables, or transaction latencies on computer system 100 or one or more processors in computer system 100; and time series of any performance parameter. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on 28 Mar. 2006, which is hereby fully incorporated by reference.

Note that sensors of computer system 100 can include but are not limited to physical sensors located in computer system 100, and virtual sensors that generate performance parameters of computer system 100. For example, performance parameters can include but are not limited to physical parameters measured using sensors located in or near computer system 100 such as temperatures and humidity within computer system 100, internal parameters of computer system 100 maintained by software operating on computer system 100 such as system throughput, transaction latencies and queue length in computer system 100, and canary parameters associated with distributed synthetic user transactions periodically generated for performance measuring purposes, such as user wait times and other quality of service metrics.

Performance-parameter monitor 106 can be implemented in any combination of hardware and software. In some embodiments, performance-parameter monitor 106 operates on computer system 100. In other embodiments, performance-parameter monitor 106 operates on one or more service processors. In still other embodiments, performance-parameter monitor 106 is located inside of computer system 100. In yet other embodiments, performance-parameter monitor 106 operates on a separate computer system. In some embodiments, performance-parameter monitor 106 includes a method or apparatus for monitoring and recording computer system performance parameters as set forth in U.S. Pat. No. 7,020,802.

Regression-coefficient mechanism 108 can be any mechanism or device that can receive monitored performance parameters from performance-parameter monitor 106 and determine regression coefficients between data from different sensors monitored by performance-parameter monitor 106. In some embodiments, regression-coefficient mechanism 108 operates on computer system 100. In other embodiments, regression-coefficient mechanism 108 operates on one or more service processors. In still other embodiments, regression-coefficient mechanism 108 is located inside of computer system 100. In yet other embodiments, regression-coefficient mechanism 108 operates on a separate computer system.

Stretching mechanism 110 can be any mechanism or device that can stretch the training data received from regression-coefficient mechanism 108 as described below. In some embodiments, stretching mechanism 110 operates on computer system 100. In other embodiments, stretching mechanism 110 operates on one or more service processors. In still other embodiments, stretching mechanism 110 is located inside of computer system 100. In yet other embodiments, stretching mechanism 110 operates on a separate computer system.

Extended-data-generation mechanism 112 can be any mechanism or device that can extend the training data as described below. In some embodiments, extended-data-generation mechanism 112 operates on computer system 100. In other embodiments, extended-data-generation mechanism 112 operates on one or more service processors. In still other embodiments, extended-data-generation mechanism 112 is located inside of computer system 100. In yet other embodiments, extended-data-generation mechanism 112 operates on a separate computer system.

Some embodiments of the present invention operate as follows. First, execution mechanism causes load script 114 to execute on computer system 100. Load script 114 may be stored on execution mechanism 104 and sent to computer system 100 or stored on computer system 100. In some embodiments, load script 114 includes but is not limited to: a sequence of instructions that produces a load profile that oscillates between specified processor utilization percentages for a processor in computer system 100, a sequence of instructions that produces a customized load profile, and/or a sequence of instructions that executes predetermined instructions causing operation of one or more devices or processes in computer system 100. In some embodiments of the present invention, load script 114 is a dynamic load script which changes the load on the processor as a function of time. While load script 114 is operating on computer system 100, performance-parameter monitor 106 monitors performance parameters of computer system 100 to generate training data. Note that in some embodiments, execution mechanism 104 is omitted and load script 114 is not executed on computer system 100 while performance-parameter monitor 106 monitors performance parameters of computer system 100.

In some embodiments, performance-parameter monitor 106 monitors performance parameters from computer system 100 for a predetermined training period which may be any length of time desired including but not limited to 1 day, 10 days, 10 to 14 days, or any period of time required to generate the required training data.

After the training data is generated, a pattern-recognition model for use in electronic prognostication for a computer system is built using the training data. Note that the pattern-recognition model can be built from the training data using any method desired without departing from the present invention. In some embodiments, a predetermined number of the most highly correlated sensors are selected and the data from these sensors is used to generate the training data which is then used to generate the pattern-recognition model.

In some embodiments, the pattern-recognition model uses a nonlinear, nonparametric regression technique. In some embodiments, the pattern-recognition model uses a multivariate state estimation technique (MSET). Note that the term "MSET" as used in this specification refers to a class of pattern-recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including ordinary least squares (OLS), support vector machines (SVM), artificial neural networks (ANNs), MSET, or regularized MSET (RMSET).

Note that the pattern-recognition model can be built for any type of electronic prognostication including but not limited to one or more of the purposes described in: U.S. patent application entitled "Computer System with Integrated Electromagnetic-Interference Detectors," by Steven F. Zwinger, Kenny C. Gross, and Aleksey M. Urmanov, Ser. No. 12/132,878 filed on 4 Jun. 2008, which is hereby fully incorporated by reference; U. S. patent application entitled "Characterizing a Computer System Using Radiating Electromagnetic Signals Monitored by an Interface," by Andrew J. Lewis, Kenny C. Gross, Aleksey M. Urmanov, and Ramakrishna C. Dhanekula, Ser. No. 12/177,724 filed on 22 Jul. 2008, which is hereby fully incorporated by reference; U.S. patent application entitled "Generating a Utilization Charge for a Computer System," by Kalyanaraman Vaidyanathan, Steven F. Zwinger, Kenny C. Gross and Aleksey M. Urmanov, Ser. No. 12/269,575 filed on 12 Nov. 2008, which is hereby fully incorporated by reference; and U.S. patent application entitled "Estimating Relative Humidity Inside a Computer System," by Leoncio D. Lopez, Kenny C. Gross, and Kalyanaraman Vaidyanathan, Ser. No. 12/114,363 filed on 2 May 2008, which is hereby fully incorporated by reference.

The training data used to generate the pattern-recognition model is then sent to regression-coefficient mechanism 108. Regression-coefficient mechanism 108 determines a regression coefficient for data from each sensor with each of the other sensors. For example, if there are N sensors, then regression-coefficient mechanism 108 determines the regression coefficients, $RC_{1j}$, between sensor 1 and sensors 2 ($RC_{12}$) through N ($RC_{1N}$); then, $RC_{2j}$, between sensor 2 ($RC_{21}$) and sensors 1, 3 ($RC_{23}$) through N ($RC_{2N}$); and repeats this process up to computing the regression coefficients, $RC_{Nj}$, between sensor N and sensors 1 ($RC_{N1}$) through N−1 ($RCN_{(N-1)}$).

Stretching mechanism 110 then receives the training data and regression coefficients from regression-coefficient mechanism 108. Stretching mechanism 110 then stretches the training data. In some embodiments, the training data is stretched as follows: for each sensor, the data from each other sensor is stretched by a predetermined amount. For example, in some embodiments, the training data is stretched in the positive direction by x % by multiplying the data from each of the other sensors by 1+(x/100) if the data is positive and by 1−(x/100) if the data is negative. The stretched data is then generated as follows: for each sensor, i, the stretched data, $E_j$, for each other sensor, j (j≠i) is multiplied by the regression coefficient $RC_{ij}$ between data from sensor i and data from sensor j and then summed together. Therefore, the expanded data for sensor i, $S_i$ is:

$$S_i = \sum_{j=1(j\neq i)}^{N} RC_{ij} E_j \tag{1}$$

Note that in some embodiments, the training data is stretched in the negative direction. For example, for each sensor, the training data from each other sensor is stretched in the negative direction by y % by multiplying the training data from each other sensor by 1−(y/100) if the data is positive and by 1+(y/100) if the data is negative. The expanded data is then generated as above using equation 1.

In some embodiments, the training data is stretched in both the positive direction and the negative direction, and the two sets of expanded data are combined with the original training data. In some embodiments, the training data is expanded in both the positive and negative direction by 5%.

In some embodiments, the training data and the expanded data are used to train a pattern-recognition model. Furthermore, in some embodiments, the predetermined amount that the training data is stretched is determined based on the performance of the pattern-recognition model trained using the training data and the expanded data. For example, alarms generated using the output from a pattern-recognition model trained using the training data and the expanded data can be compared to alarms generated using output from a pattern-recognition model trained using only the training data. Specifically, a statistical hypothesis test such a SPRT can be applied to the output of the pattern-recognition model to generate alarms. Then, the predetermined amount that the training data is stretched by to generate the expanded data can be determined by setting a limit on the number of false alarms generated and/or the sensitivity of the alarm generation to the electronic prognostication goals of the pattern-recognition model, including but not limited to a failure of a sensor or component in computer system 100. In one embodiment, the predetermined amount that the training data is stretched by is determined by requiring the number of false alarms to be zero when a component such as a memory module is upgraded, while ensuring that alarms are still generated by a failing upgraded or non-upgraded memory module.

Figure 2:
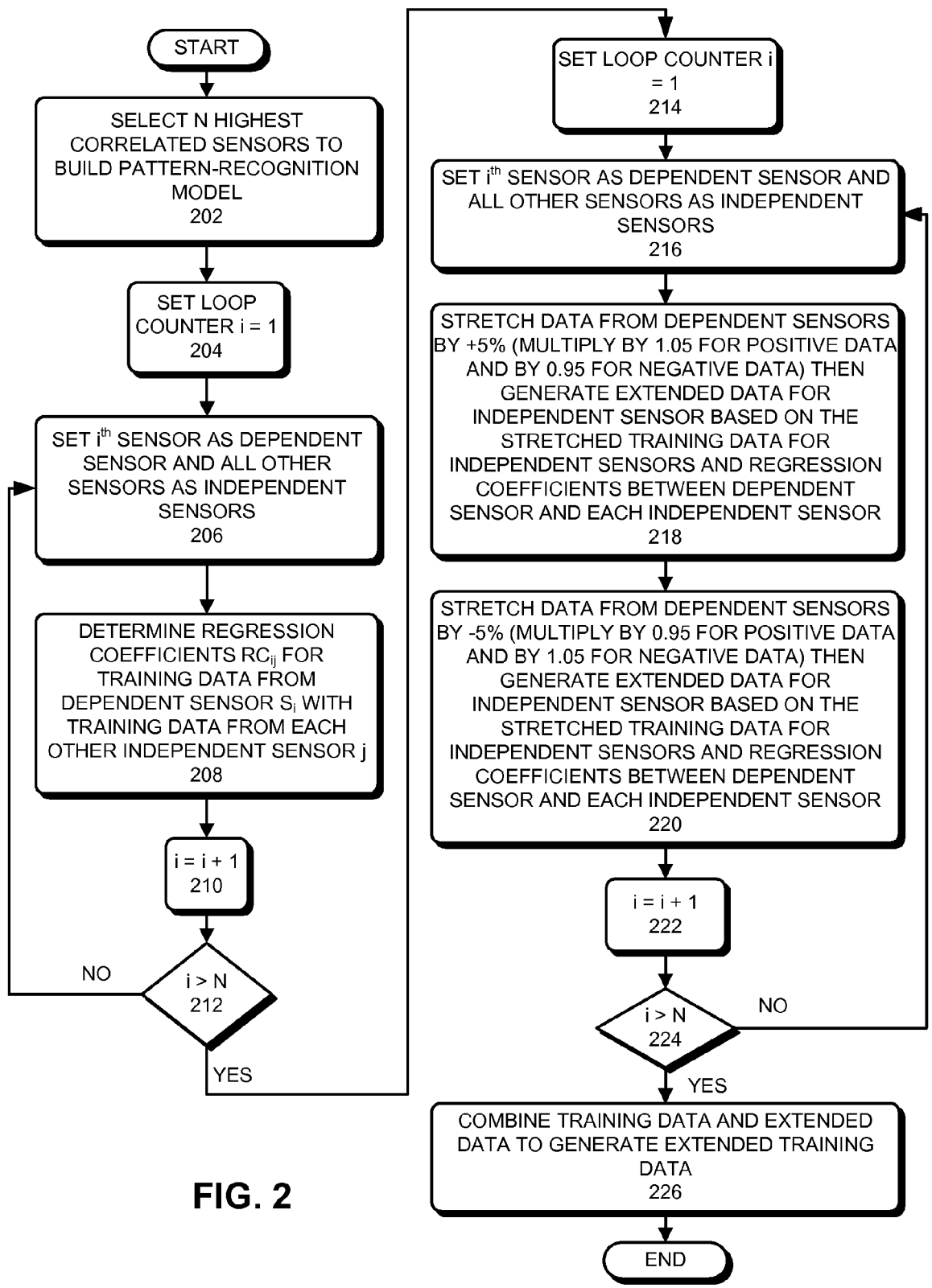
FIG. 2 presents a flow chart illustrating a process that generates extended data for a pattern-recognition model used in electronic prognostication for a computer system in accordance with some embodiments of the present invention.

FIG. 2 presents a flow chart illustrating a process that generates extended data for a pattern-recognition model used in electronic prognostication for a computer system in accordance with some embodiments. First, the N sensors with the highest correlation are selected and used to build a pattern-recognition model (operation 202). Then, a loop counter, i, is set equal to 1 (operation 204). Next, the $i^{th}$ sensor is set as the dependent sensor and the other N−1 sensors are set as independent sensors (operation 206), and regression coefficients $RC_{ij}$ are determined for training data from sensor i with data from each of the other N−1 sensors j, as j goes from 1 to N (j≠i) (operation 208). The loop counter is incremented by 1 (operation 210), and if the loop counter is not greater than N (operation 212), then the process returns to operation 206. If the loop counter is greater than N (operation 212), then the process continues to operation 214.

Next, the loop counter, i, is set to 1 (operation 214). The $i^{th}$ sensor is then set as the dependent sensor and the other N−1 sensors are set as independent sensors (operation 216). The data from each dependent sensor is stretched by +5% (operation 218). The data is multiplied by 1.05 to stretch it by +5% if the data is positive and multiplied by 0.95 if the data is negative. The stretched data for each dependent sensor is then multiplied by the regression coefficient between the dependent sensor and the independent sensor (operation 218). Extended data for the $i^{th}$ sensor is then generated by summing the product of the stretched data for each dependent sensor and the regression coefficient between the dependent sensor and the independent sensor (218).

Then, the data from each dependent sensor is stretched by −5% (operation 220). The data is multiplied by 0.95 to stretch it by −5% if the data is positive, and multiplied by 1.05 if the data is negative. The stretched data for each dependent sensor is then multiplied by the regression coefficient between the dependent sensor and the independent sensor (operation 220). Extended data for the $i^{th}$ sensor is then generated by summing the product of the stretched data for each dependent sensor and the regression coefficient between the dependent sensor and the independent sensor (operation 220).

Next, the loop counter is increased by 1 (operation 222), and if the loop counter is not greater than N (operation 224), then the process returns to operation 216. If the loop counter is greater than N (operation 224), then the process continues to operation 226. Then, the extended training data is generated by combining the extended data and the training data (operation 226). In some embodiments, the extended data and the training data are combined to generate the extended training data by concatenating the extended data and the training data.

In some embodiments, values for stretching the data other than +5% or −5% can be used without departing from the present invention. As discussed both above and below, a pattern-recognition model based on the training data and excluding the extended data can be tested to determine if a pattern-recognition model generated using both the training data and the extended data results in acceptable performance of the pattern-recognition model.

FIGS. 3 and 4 depict performance parameters monitored from a computer system operating in a regime outside of the training data set but with no real degradation of the computer system. The monitored parameters are used as input to a pattern-recognition model to generate residuals and alarms using SPRT.

FIG. 3A depicts a monitored signal representing data monitored from the computer system and an estimate of the monitored signal generated from a pattern-recognition model trained using training data without extended data. During the monitoring depicted in FIG. 3A, the computer system operated in a regime outside of the regime it operated in during the training period due to an upgrade of memory DIMMs in the computer system after the training period. FIG. 3B represents a residual signal generated by taking the difference between the monitored signal and the estimated signal depicted in FIG. 3A. FIG. 3C represents alarms generated based on a SPRT. Note that in FIG. 3C, after about 1500 minutes, SPRT alarms are generated as the computer system operates outside of the operating regime during which the training data was generated, even though the computer system is properly functioning.

FIG. 4A depicts a monitored signal representing data monitored from the computer system and an estimate of the monitored signal generated using a pattern-recognition model trained using training data along with extended data. During the monitoring depicted in FIG. 4A, the computer system operated in a regime outside of the regime during the training period due to an upgrade of memory DIMMs in the computer system after the training period. FIG. 4B represents a residual signal generated by taking the difference between the monitored signal and the estimated signal depicted in FIG. 4A. FIG. 4C represents alarms generated based on a SPRT of the residuals in FIG. 4B. Note that in FIG. 4C, no SPRT alarms are generated as the computer system operates outside of the operating regime in which the training data was generated.

In some embodiments, the predetermined amount that the training data is stretched is determined based on the number of false alarms generated using a pattern-recognition model that was trained using both the training data and the extended data as the computer system operates in a regime outside of the regime in which the training data was generated. In some embodiments, the predetermined amount is determined based on generating no false alarms as the computer system operates in a regime outside of the regime in which the training data was generated. For example, the predetermined amount may be set by requiring that no false alarms are generated when a memory module in a computer system is upgraded and the computer system is functioning correctly.

FIGS. 5 and 6 depict monitored and estimated signals, residuals and SPRT alarms from a computer system in which there is real degradation of the monitored computer system in the form of degradation of a sensor used to monitor data from the computer system. FIG. 5A depicts a monitored signal representing data monitored from the computer system and an estimate of the monitored signal generated using a pattern-recognition model trained using the training data without extended data. FIG. 5B represents the residual signal generated by taking the difference between the monitored signal and the estimated signal depicted in FIG. 5A. Note that in FIG. 5C, after about 1500 minutes, alarms are generated as a result of the degradation of the sensor being detected by SPRT.

FIG. 6A depicts a monitored signal representing data monitored from the computer system and an estimate of the monitored signal generated using a pattern-recognition model trained using the training data along with extended data. FIG. 6B represents the residual signal generated by taking the difference between the monitored signal and the estimated signal depicted in FIG. 6A. Note that in FIG. 6C just as in FIG. 5C, after about 1500 minutes, SPRT alarms are generated as a result of the degradation of the sensor being detected by the SPRT. The similarity of the response of the SPRT alarms in FIGS. 5C and 6C shows that there is no loss of sensitivity in the ability of the pattern-recognition model trained using the training data combined with the extended data to detect degradation of the computer system.

In some embodiments, the predetermined amount that the training data is stretched is determined based on a comparison of the number of alarms generated during degradation of the computer system when the pattern-recognition model is trained using only the training data (training data alarms) and when the pattern-recognition model is trained using the training data and the extended data (stretched data alarms). In some embodiments, the predetermined amount is determined based on generating an equal number of alarms when the pattern-recognition model is trained using only the training data (training data alarms) and when the pattern-recognition model is trained using the training data and the extended data (stretched data alarms).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for generating extended data for a pattern-recognition model used in electronic prognostication for a computer system, the method comprising:
   for each sensor in a set of sensors, determining a regression coefficient between training data from the sensor and training data from each of the other sensors in the set of sensors; and
   for each sensor in the set of sensors,
      stretching the training data from each of the other sensors by a predetermined amount; and
      generating extended data for the sensor based on the stretched training data for each of the other sensors and the regression coefficients between training data from the sensor and training data from each of the other sensors.

2. The method of claim 1, wherein the pattern-recognition model uses a nonlinear, nonparametric regression technique.

3. The method of claim 1, wherein the pattern-recognition model uses a multivariate state estimation technique (MSET).

4. The method of claim 1,
   wherein the predetermined amount that the training data is stretched is determined based on a difference between:
   stretched data alarms generated by a statistical hypothesis test of residuals using a test data set for the pattern-recognition model trained with both the training data set and the extended data; and
   training data alarms generated by the statistical hypothesis test of residuals using the test data set for the pattern-recognition model trained with the training data set and excluding the extended data.

5. The method of claim 4, wherein the test data set includes test data collected during degradation of the computer system, and wherein the number of training data alarms is equal to the number of stretched data alarms.

6. The method of claim 4, wherein the test data set includes test data collected during periods where there is no degradation of the computer system and there are no false stretched data alarms.

7. The method of claim 1, further including:
   for each sensor in the set of sensors,
      stretching the training data from each of the other sensors by a second predetermined amount; and
      generating extended data for the sensor based on the training data stretched by the second predetermined amount, for each of the other sensors and the regression coefficients between training data from the sensor and training data from each of the other sensors.

8. A method of claim 1, wherein the set of sensors includes only a predetermined number of the sensors in the computer system with the highest correlations.

9. The method of claim 1,
   wherein the training data is monitored from the sensors in the computer system during a training period;
   wherein monitoring the training data includes systematically monitoring and recording the set of training data of the computer system; and
   wherein the recording process keeps track of the temporal relationships between events from different sensors.

10. A computer-readable storage medium storing instructions that when executed by a computer cause the computer to perform a method for generating extended data for a pattern-recognition model used in electronic prognostication for a computer system, the method comprising:
    for each sensor in a set of sensors, determining a regression coefficient between training data from the sensor and training data from each of the other sensors in the set of sensors; and
    for each sensor in the set of sensors,
       stretching the training data from each of the other sensors by a predetermined amount; and
       generating extended data for the sensor based on the stretched training data for each of the other sensors and the regression coefficients between training data from the sensor and training data from each of the other sensors.

11. The computer-readable storage medium of claim 10, wherein the pattern-recognition model uses a nonlinear, non-parametric regression technique.

12. The computer-readable storage medium of claim 10, wherein the pattern-recognition model uses a multivariate state estimation technique (MSET).

13. The computer-readable storage medium of claim 10,
wherein the predetermined amount that the training data is stretched is determined based on a difference between:
stretched data alarms generated by a statistical hypothesis test of residuals using a test data set for the pattern-recognition model trained with both the training data set and the extended data; and
training data alarms generated by the statistical hypothesis test of residuals using the test data set for the pattern-recognition model trained with the training data set and excluding the extended data.

14. The computer-readable storage medium of claim 13, wherein the test data set includes test data collected during degradation of the computer system, and wherein the number of training data alarms is equal to the number of stretched data alarms.

15. The computer-readable storage medium of claim 13, wherein the test data set includes test data collected during periods where there is no degradation of the computer system and there are no false stretched data alarms.

16. The computer-readable storage medium of claim 10, further including:
for each sensor in the set of sensors,
stretching the training data from each of the other sensors by a second predetermined amount; and
generating extended data for the sensor based on the training data stretched by the second predetermined amount, for each of the other sensors and the regression coefficients between training data from the sensor and training data from each of the other sensors.

17. A computer-readable storage medium of claim 10, wherein the set of sensors includes only a predetermined number of the sensors in the computer system with the highest correlations.

18. The computer-readable storage medium of claim 10,
wherein the training data is monitored from the sensors in the computer system during a training period;
wherein monitoring the training data includes systematically monitoring and recording the set of training data of the computer system; and
wherein the recording process keeps track of the temporal relationships between events from different sensors.

19. An apparatus for generating extended data for a pattern-recognition model used in electronic prognostication for a computer system, the apparatus comprising:
a determining mechanism configured to determine, for each sensor in a set of sensors, a regression coefficient between training data from the sensor and training data from each of the other sensors in the set of sensors;
a generating mechanism configured, for each sensor in the set of sensors, to stretch the training data from each of the other sensors by a predetermined amount, and generate extended data based on the stretched training data for each of the other sensors and the regression coefficients between training data from the sensor and training data from each of the other sensors.

20. The apparatus of claim 19, further including:
a monitoring mechanism configured to monitor the training data from the sensors in the computer system during a training period, wherein the monitoring mechanism includes a mechanism that is configured to systematically monitor and record the training data of the computer system, and wherein the monitoring mechanism includes a mechanism that is configured to keep track of the temporal relationships between events from different sensors.

* * * * *